Mar. 6, 1923.
J. C. TOLLEFSON.
EXTENSION FEEDER.
FILED JAN. 14, 1922.
1,447,580.
3 SHEETS—SHEET 2.
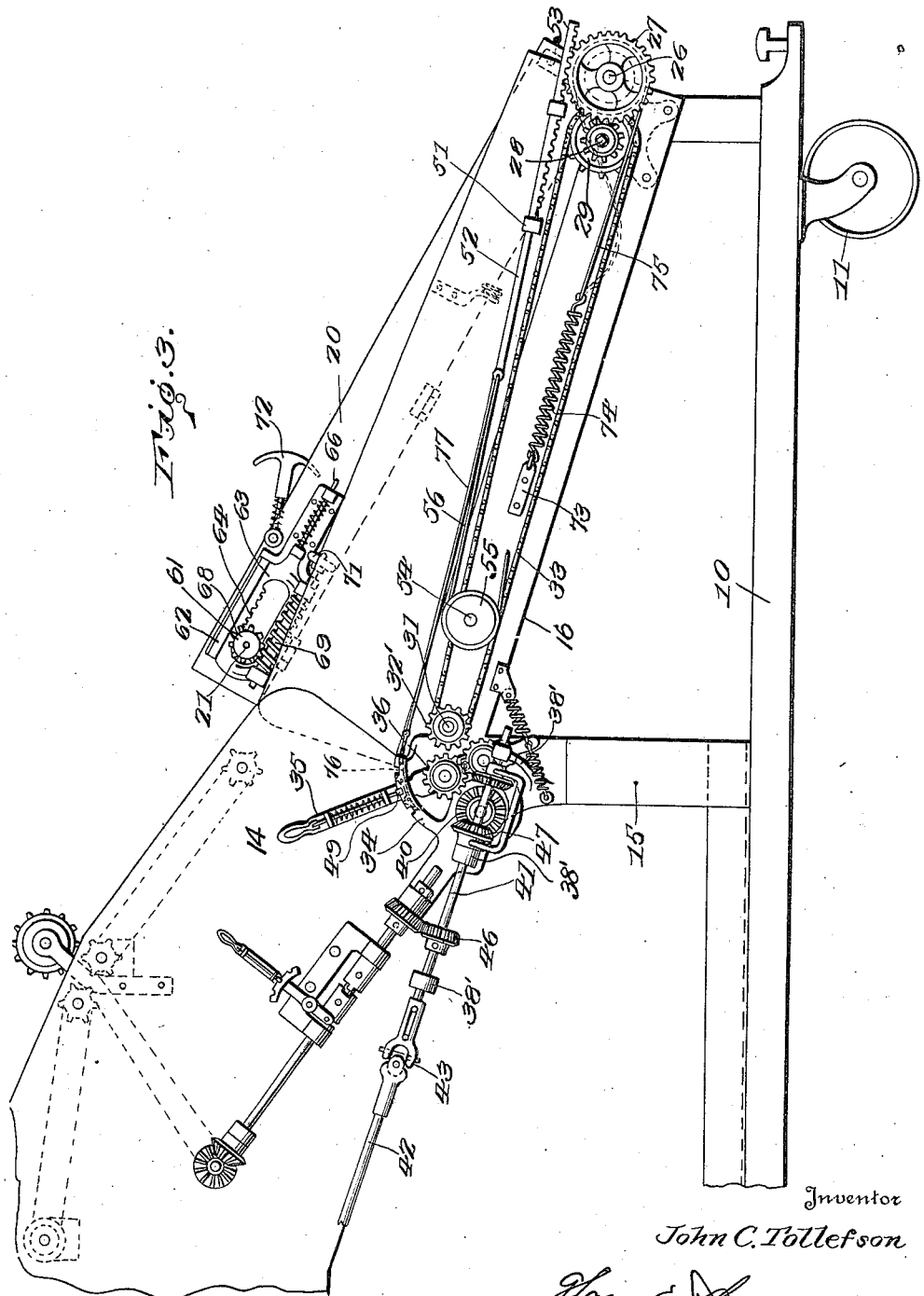
Inventor
John C. Tollefson
By
Attorney

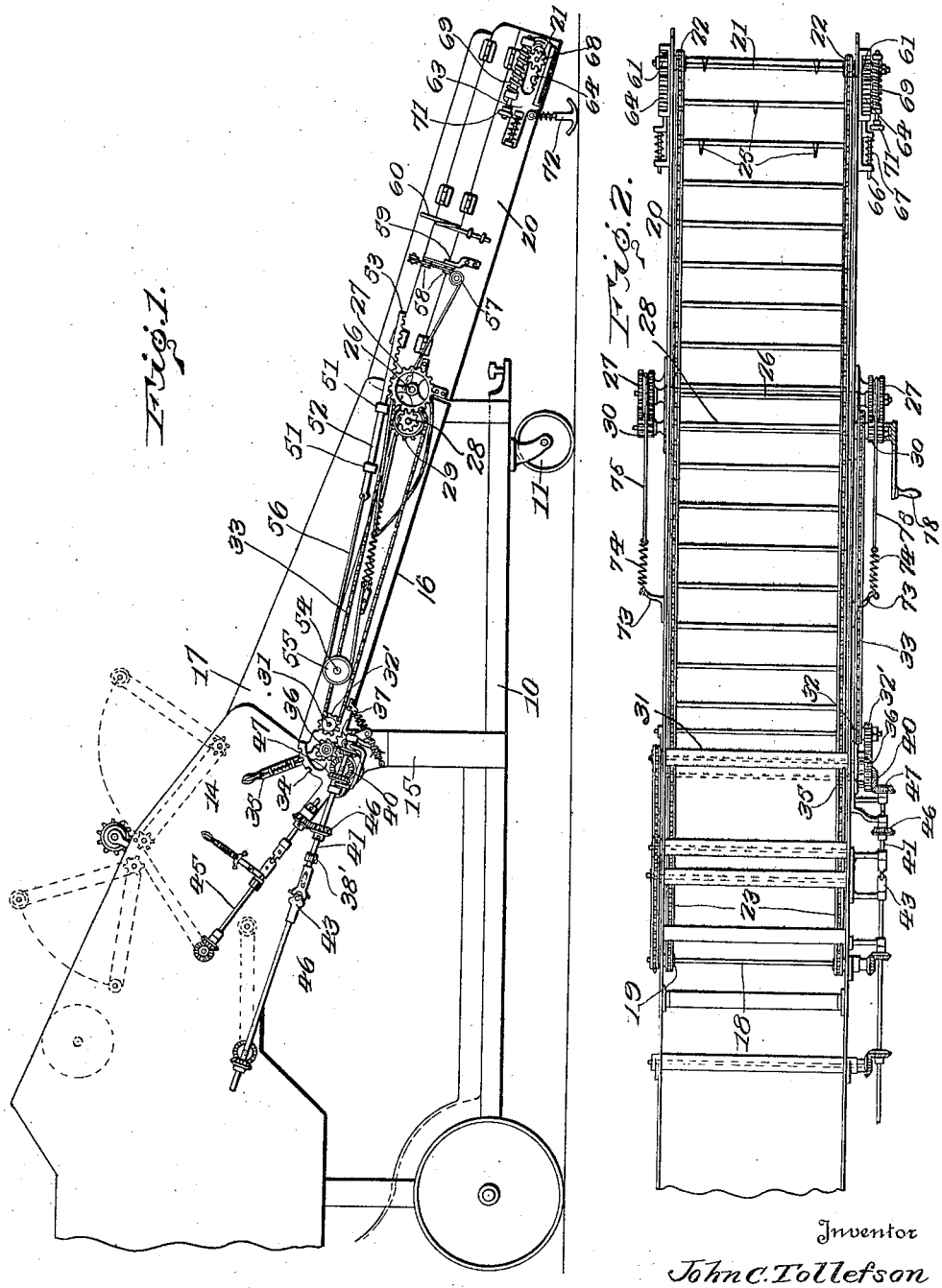

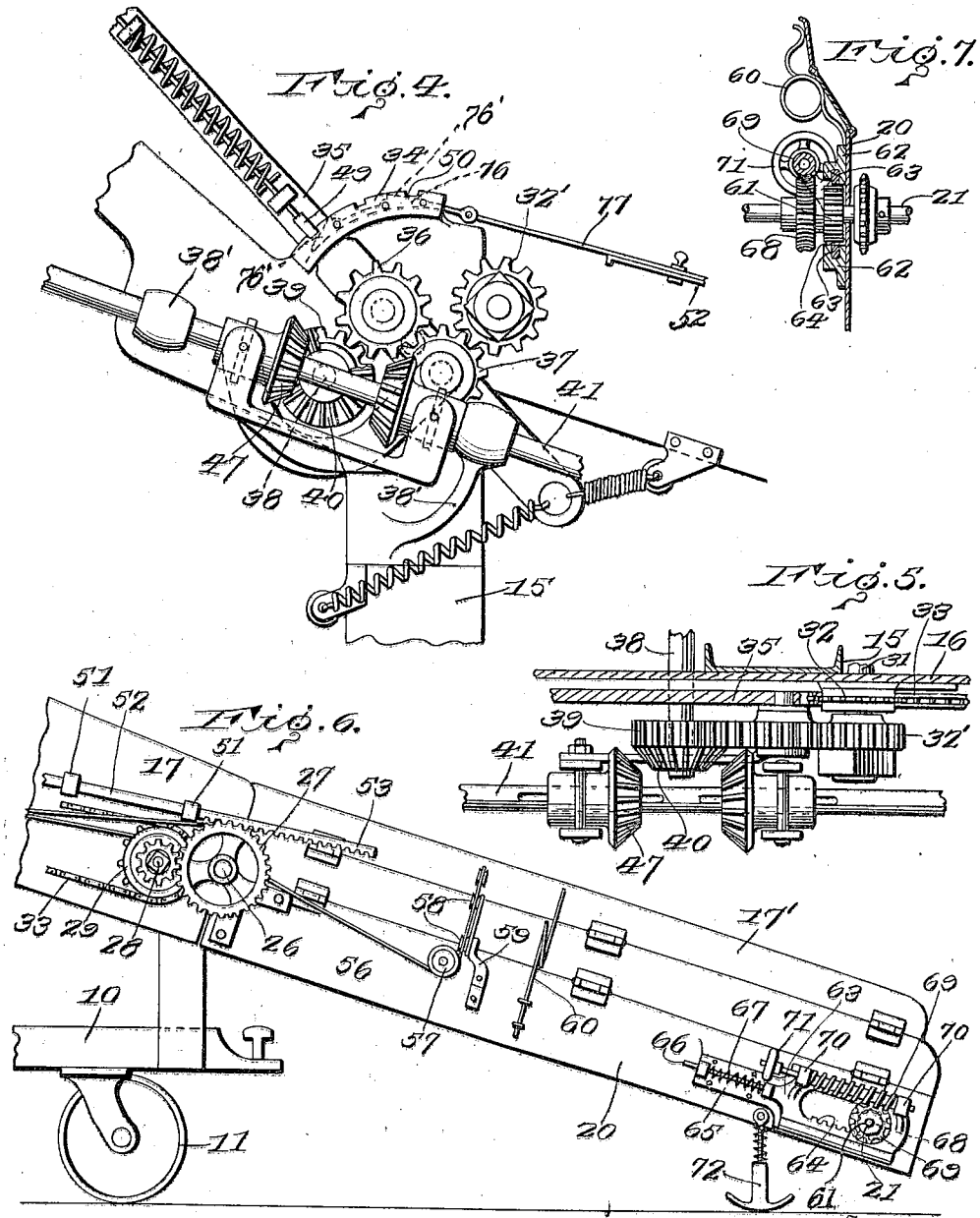

Patented Mar. 6, 1923.

1,447,580

UNITED STATES PATENT OFFICE.

JOHN C. TOLLEFSON, OF KANSAS CITY, KANSAS.

EXTENSION FEEDER.

Application filed January 14, 1922. Serial No. 529,312.

*To all whom it may concern:*

Be it known that I, JOHN C. TOLLEFSON, a citizen of the United States, residing at Kansas City, in the county of Wyandotte, State of Kansas, have invented certain new and useful Improvements in Extension Feeders; and I do hereby declare the following to be a full, clear, and exact description of the invention, such as will enable others skilled in the art to which it appertains to make and use the same.

This invention relates to new and useful improvements in feeders and particularly to feeders for separators.

The invention is an improvement over my pending application for an extension feeder, filed July 28, 1920, Ser. No. 399,592.

One object of the invention is to provide a feeder which can be easily and quickly coupled to the feed end of a separator and which can be readily folded and unfolded.

Another object is to provide a feeder of this character which can be automatically folded and unfolded, by the driving power from the separator.

A further object is to provide a feeder of this character wherein is contained means for shifting the driving power from the feeding apron or belt to the mechanism for folding and unfolding the frame of the feeder.

A still further object is to provide a feeder of this character which has folding sideboards, and wherein the side-boards are automatically folded and unfolded as the feeder frame is folded or unfolded.

Other objects and advantages will be apparent from the following description when taken in connection with the accompanying drawings.

In the drawings:

Figure 1 is a side elevation of a feeder made in accordance with the invention, and showing a portion of a separator associated therewith.

Figure 2 is a top plan view of the same.

Figure 3 is a side elevation of the device in folded position.

Figure 4 is an enlarged side elevation of the means for shifting the gearing and causing the side-boards of the feeder frame to fold.

Figure 5 is a top plan view of the parts shown in Figure 4.

Figure 6 is an enlarged side elevation of the outermost section of the feeder frame and a portion of the inner section, showing the operating elements associated therewith.

Figure 7 is a vertical transverse sectional view through the outer end of the outer section of the feeder frame, with certain parts shown in elevation.

Referring particularly to the accompanying drawings 10 represents the running gear of the feeder which has its outer end supported by the ground wheels 11, and has its other end to the axle 13 of the feed end of the separator 14. On the running gear are mounted the uprights 15 which support the longitudinal and downwardly and outwardly inclined frame 16, which has the side boards 17. Supported in the sides of the upper end of the frame 16 is the transverse shaft 18, on the opposite ends of which, and inwardly of the sides 17, are mounted the sprockets 19. Pivotally connected to the outer end of the frame 16 is the extension section 20, and in the outer end of this section is mounted the transverse shaft 21 having the sprockets 22, and engaged around the sprockets 19 and 22 are the endless chains 23 which have the connecting slats 24, and the grain gripping means 25, described in the prior application, hereinbefore-mentioned, and forming the subject-matter of a separate application filed September 7, 1921, Ser. No. 498,981, divided out of the said prior application. The pivot of the section 20 consists of the transverse shaft 26, and on each end of this shaft, outwardly of the side-boards, are the gears 27. Extending through the lower end of the frame 16, adjacent the shaft 26, and parallel thereto, is a transverse shaft 28, which has on its ends the sprockets 29 and the gears 30, the latter of which mesh with the gears 27. Extending through the frame 16, above the inner upright 15, is a shaft 31 having on its ends the sprockets 32 and the gear 32'. Engaged around the sprockets 29 and 32 are the chains 33, to which reference will be made later herein.

Mounted on the upper end of the frame 16 is a rack segment 34, and pivotally mounted on this segment is a lever 35. Above the pivot of the lever there is mounted an idler gear 36, and on the lower end of the lever, below the pivot thereof, is a second idler gear 37. Extending transversely through the frame 16, adjacent the pivot of the lever 35, is a shaft 38, and on one end of this shaft there is mounted a combined spur gear 39 and bevel gear 40, the former of which is arranged to be engaged by the lower gear 37, when the lever is swung in one direction. Brackets 38' are also carried by this end of the frame 16, and rotatable in these brackets is the shaft section 41. This shaft section 41 is connected with the shaft section 42, by means of the universal joint 43, said section 42 being supported on the side of the feed end of the separator. Adjacent the lower end of the shaft section 41 there is mounted the transverse shaft 38 which has on one end the bevel gear 40 which meshes with a similar gear 47 on the lower end of the shaft section 41. The bevel gear 40 has an integral spur gear 39 with which the gear 37 is arranged to mesh when the lever 35 is rocked on its pivot. The lever has a spring pressed plunger pawl 49, which is arranged for interchangeable reception in the notches 50 of the rack segment 34. Slidable in brackets 51, on the side of the lower end of the frame 16, is a bar 52 the outer end of which is formed with a toothed rack 53 which meshes with the gear 27. Adjacent the upper end of the frame 16 is a transverse shaft 54 which has the pulleys 55 on its ends, and engaged around each of these pulleys is a cable 56, one end of said cable being connected to the adjacent end of the bar 52, while the other end passes over the shafts 26 and 28 and around a grooved wheel 57, mounted on the side of the lower section of the feeder, and thence around two vertically alined pulleys 58, mounted on a bracket 59, where it is secured to the uppermost of the foldable sideboards 17'. Springs 60 are connected to the side walls of the said lower section of the feeder frame 16, and to the foldable boards 17', so that when released they will automatically fold themselves down onto the top of the apron of the conveyor of the chute.

On the ends of the lower shaft 21 are gears 61 which are disposed outwardly of the side-board of the section 20. On the said side-boards, above and below the ends of the shaft and the said gears 61, are the longitudinal guides 62, and slidable in each pair of guides is a yoke 63, the inner face of the lower leg of each of which is formed with rack teeth 64 which mesh with the lower side of the gear 61'. At the inner ends of each pair of the guides 63, there is mounted a bracket 65, through which is slidably disposed the rod 66 carried by the inner end of the yoke 63, a coil spring 67 encircling each of these rods and bearing against the yoke and the bracket. On one end of the shaft 21 there is secured a worm gear 68 which is meshed by the worm 69 mounted in suitable brackets 70, above the upper guide. A hand-wheel 71 is mounted on one end of the worm for manual manipulation to turn the worm and cause the yoke to slide in the guides, so that the shaft 21 may be moved bodily for regulating the tension of the conveyor apron. A spring pressed supporting leg 72 is pivotally carried by each side of the lower end of the section 20, for engagement with the ground to support the said end of the section above the ground.

Mounted on one side of the section 17 is a bracket 73, and secured at one end to this bracket is a coil spring 74. Connected to the other end of the spring, and extended to and secured to the axis of the gear 27, is a cable 75.

It will be noted that the rack segment 34 is in the form of a channel, and that there is a curved member 76 disposed in this channel, said curved member having a pair of oppositely directed arrow portions 76', which are arranged to lift the pawl 49, of the lever 35, out of the notches, and permit the lever to swing on its pivot and release the gears from their driven engagement with the thrasher. The other end of this curved member 76 is connected with the adjacent end of the bar 52, by means of the rod 77. Thus, when the section 20 nears its completely folded position, the rod 52 will push the rod 77, and consequently the curved member 76, so that the pawl of the lever 35 will be released from the notch of the segment, and the power which serves to fold the section 20, thrown out of gear.

As clearly seen in Figure 2, the shaft 28 is formed to receive the crank handle 78, whereby the sections may be folded by hand, when power is not available.

What is claimed is:

1. An extension feeder comprising a portable support, a pair of foldable sections mounted on the support, an endless conveyor on the sections, means for operatively connecting the conveyor with the driving mechanism of another machine, and means for automatically folding the sections through the medium of the driving means of the other machine.

2. An extension feeder for a thrashing machine comprising foldable conveyor carrying sections, one of the sections having spring pressed foldable side-boards, said side-boards being self-folding when the sections fold, and means operable upon unfolding the sections for unfolding the said sideboards.

3. An extension feeder including a pair of pivotally connected chute sections, each section having side-boards, the outer section having auxiliary foldable side-boards, spring means between the chute side-boards and the foldable boards for automatically folding the latter when the sections are folded, and a flexible element connected with the foldable boards and operable upon folding the sections to fold the foldable boards.

4. In an extension feeder, a pair of foldable chute sections, a shaft forming the pivot of the sections, gears on the ends of the shaft, a shaft in the uppermost section, pulleys on the said last-named shaft, foldable spring pressed side-boards on the lowermost section, guides on the first section, a rack bar slidable in the guides and engaging with the said gears, and a cable engaged around said pulleys and having its ends connected respectively with the rack bar and with the foldable side-boards, whereby when the sections move toward folded position the boards will be permitted to fold, and when the sections move toward unfolded position the cable unfolds said boards.

In testimony whereof, I affix my signature, in the presence of two witnesses.

JOHN C. TOLLEFSON.

Witnesses:
H. P. KIRBY,
S. S. KIRBY.